Sept. 15, 1942.   R. L. WAGNER   2,295,701
METHOD AND APPARATUS FOR APPLYING METAL COATINGS
Filed Sept. 1, 1939
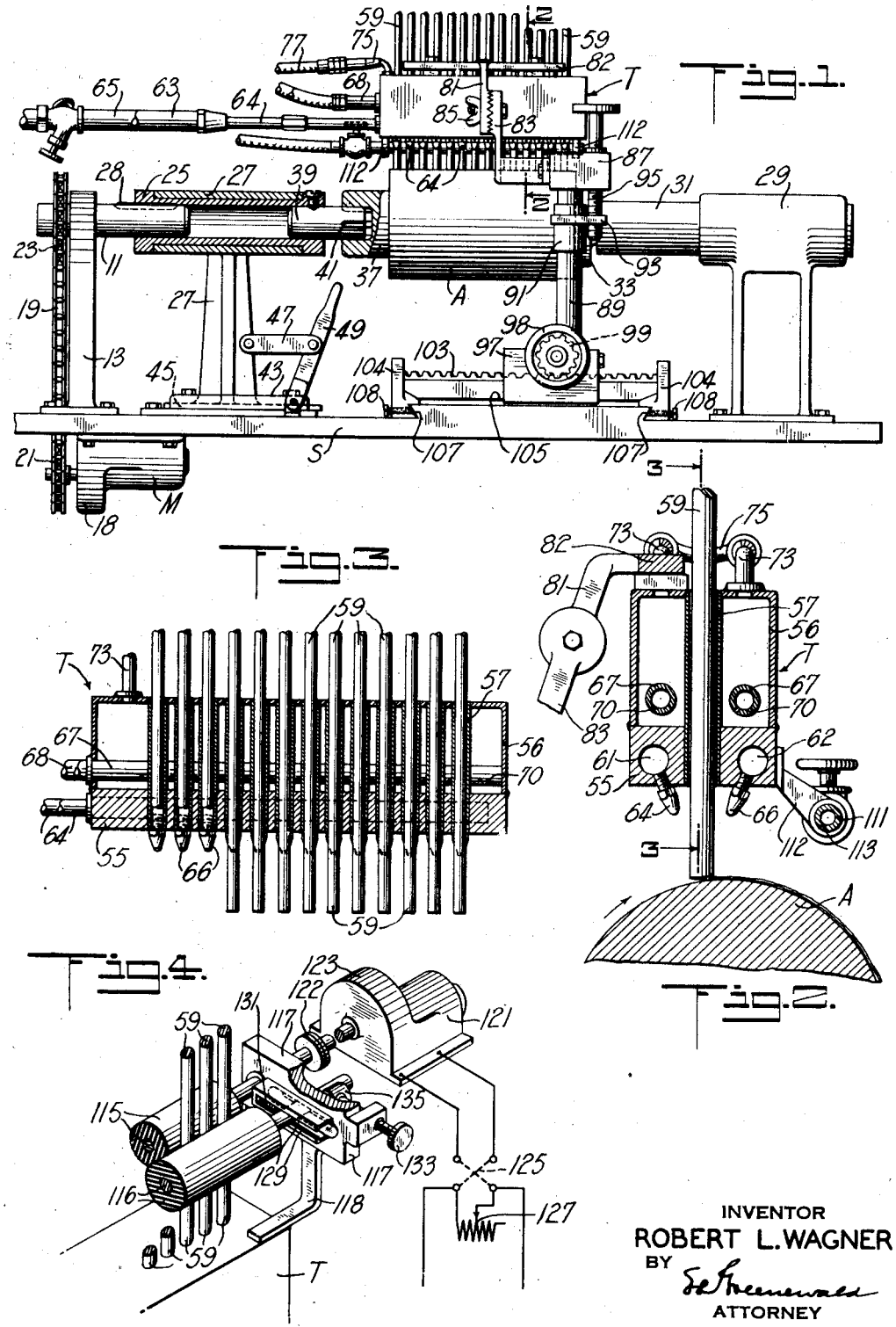
INVENTOR
ROBERT L. WAGNER
BY
ATTORNEY Patented Sept. 15, 1942

2,295,701

UNITED STATES PATENT OFFICE 2,295,701

METHOD AND APPARATUS FOR APPLYING METAL COATINGS

Robert Luther Wagner, Niagara Falls, N. Y., assignor to Haynes Stellite Company, a corporation of Indiana Application September 1, 1939, Serial No. 292,988

28 Claims. (Cl. 117—46)

The present invention relates to welding and brazing operations; and more especially it concerns a method and apparatus whereby uniform welded-on overlays, coatings or facings may readily be applied to the surfaces of metal articles, or portions thereof,—and especially those articles having the general shape of solids of revolution. The invention has especial utility for the deposition, upon the cylindrical, conical and frusto-conical surfaces of metal articles, of uniform layers of selected thickness of wear-resistant and/or corrosion-resistant metals and alloys, such as those of the class of non-ferrous alloys composed of cobalt, chromium, and tungsten. The following description is directed principally to this application of the invention.

Welded-on metal overlays or coatings are now extensively used in the repair of metal rolls worn in service, and for forming on metal articles welded-on coatings of wear-resistant metals and corrosion-resistant metals and alloys, as well as for many other applications wherein it is desirable to have upon the surface of a metal article a body of metal other than that of which the matrix is composed.

The deposition of welded-on metal overlays or facings of uniform thickness upon articles having the shape of solids of revolution heretofore has presented many practical difficulties not encountered in the deposition of overlays on articles intended for services wherein a smooth, continuous surface layer of the coating metal is not required. Metallic arc welding methods are not entirely suitable for this application of metal overlays of hard facing metal upon articles of softer metal, due to the fact that such methods cause interalloying and dilution of the hard facing metal with the matrix metal of which the article is composed.

While this objectionable condition may be largely avoided by using manual autogenous gas welding procedures, most attempts, prior to the present invention, to apply to cylindrical metal articles uniform metal coatings have proved inefficient from the standpoint of both labor and fuel utilized,—involving the welding of elongated bodies of the surfacing metal in overlapping parallel rows disposed longitudinally of the article. Such manual procedures are exceedingly tedious, and necessitate repeated fluxing and reheating of the rod of surfacing metal. The finished coating is far from smooth. Any smoothing of the very hard surface after its formation necessitates a lengthy, tedious grinding procedure. Thus, it is very important, from a practical standpoint, that the original deposit of surfacing metal be smooth and uniform as deposited, and that it be intimately bonded to the base metal, while avoiding objectionable excessive interalloying of the two compositions.

Among the more important objects of the invention are the following:

To provide in novel manner for welding a smooth uniform metal surface layer upon a metal article, or portion thereof,—especially an article having the general shape of a solid of revolution; to provide a novel process and apparatus utilizing a gas-welding procedure in forming a smooth uniform metal coating upon a metal article; to provide in novel manner for preheating a metal article preparatory to applying thereto a welded-on metal overlay; to provide for the uniform metal-surfacing of an article having a surface of revolution, with a minimum of expense for materials and labor. Other objects will be apparent to those skilled in the art from a review of the following description:

According to a preferred modification of the invention, the article to be surfaced is slowly rotated upon its longitudinal axis. Concurrently therewith it may be preheated to any desired temperature, as by passing the uppermost surface portion of the rotating article beneath an elongated flame or plurality of flames directed upon said surface from one or more rows of closely spaced flame source means such as oxy-fuel gas blowpipe tips or the equivalent, associated with a plurality of blowpipes, or with one or more multi-tip blowpipes, the said tips being aligned and spaced in a manner to provide a wide substantially continuous flame and apply it against the surface of the article in producing an elongated high-temperature zone extending parallel to the longitudinal axis of the article. The aligned blowpipe tips extend substantially the full length of the article, or of the portions thereof to be coated. Preferably two series or rows of aligned tips are spaced apart and directed to discharge flames upon the article within said zone.

The torch or torches preferably are of the oxy-fuel gas type, utilizing mixtures of oxygen and acetylene. The proportions of fuel gas and oxygen flowing to the torches are preferably adjusted to provide a gas mixture in which the volume of oxygen is less than that required for complete combustion of the fuel gas,—for instance, an oxyacetylene mixture containing more than one volume of acetylene per volume of oxygen. The flames produced by the combustion of such mixtures are referred to herein as "carburizing flames," and as "excess fuel gas flames." The oxyacetylene mixtures described in the United States patent, No. 1,978,281, of Harry S. George are well adapted for use in the process.

After the article has reached the desired temperature,—in instances when the preheating of the article is advantageous or necessary,—a plurality of closely spaced rods or bodies of the coating metal or alloy are disposed with their lower ends in said high-temperature zone and in contact with the upper surface of the rotating article immediately before it reaches the highest point in its path of travel. The ends of these rods or bodies of coating metal are fed between the rows of blowpipe tips to the article, through guide tubes carried by the blowpipe head, or by equivalent means. Preferably a gravity feed of the rods is employed; though a mechanical rod-feeding means may be utilized such as that hereinafter described. The blowpipe tips direct flames upon these portions of the surface of the article in the high-temperature or welding zone, and upon the lowermost portions of the rods of coating metal. The speed of rotation of the article preferably is so correlated with the intensity of the flames produced by the blowpipes and the disposition of the bodies of coating metal that the article is coated with a uniform layer of the surfacing metal in a single revolution.

As the successive portions of the article leave the relatively narrow, elongated welding or surfacing zone it is advantageous to flow a mild current of air, steam, or other suitable cooling medium into contact with the newly deposited coating at a point adjacent the said zone. Such cooling fluid chills or sets the metal overlay, thus preventing it from dripping forward over the curved surface of the article, and aiding to form and maintain a smooth, uniform metal overlay upon the surface of the article. Any other cooling medium such, for example, as a fine spray of water may be used, in which case the overlay receives a more severe cooling or quenching.

In many practical applications of the invention it is advantageous to apply continuously at the high-temperature surfacing zone a uniform amount of a flux to assist in preventing formation of pinholes in the metal overlay and in securing a suitable bond between the surface metal of the article and the deposited surfacing metal.

One especially convenient method for uniformly applying the flux involves the use of a volatile alkyl borate, either alone or in admixture with a suitable solvent. Examples of such fluxes are: distilled methyl or ethyl borate; and an at least approximately azeotropic solution of ethyl borate in ethanol. These fluxes, and procedures for their use, are set forth more fully in the United States Patent No. 2,262,187 of A. R. Lytle and T. H. Vaughn, entitled "Volatile welding fluxes," and in the copending application, Serial No. 292,989 of William A. Wissler entitled "Method of and apparatus for applying metal coatings," filed September 1, 1939. All or a selected portion of the welding gas flowing to one or both of the blowpipes thus is contacted with a liquid body of the flux composition, whereby the flux is fed continuously and uniformly to the surfacing zone in the welding gas mixtures.

Alternatively, the welding rods may have a surface coating of a borosilicate glass or other flux; or a powdered solid flux such as borax may be fed uniformly to the surfacing zone from an automatic flux dispenser. When applying overlays of many metals,—such for example as the aforementioned non-ferrous type of wear-resistant alloys,—using carburizing flames,—a flux is unnecessary.

In the accompanying drawing, illustrating apparatus adapted for the practice of one modification of the invention;

Fig. 1 is a vertical section taken longitudinally through one form of the apparatus, parts being broken away, and parts being shown in section;

Fig. 2 is a fragmentary section through a torch block and associated parts, taken along the lines 2—2 of Fig. 1, looking in the direction of the arrows, parts being broken away;

Fig. 3 is a longitudinal section on a somewhat smaller scale, taken along the lines 3—3 of Fig. 2, looking in the direction of the arrows, parts being omitted, and parts being broken away; and Fig. 4 is a perspective view of a portion of a welding rod-feeding means and associated parts, parts being shown in section, and parts being broken away.

Referring to Fig. 1 of the drawing, a shaft 11 is journalled for rotation in a bracket 13 mounted upon a suitable elongated supporting member S. The shaft is rotated at a uniform selected rate by means of a variable speed electric motor M or the equivalent, through a reduction gear 16, a chain 19, and sprockets 21 and 23. A sleeve 25 having flanged ends is mounted for rotation upon a bracket 27, and is keyed to shaft 11 by key 28 for free longitudinal sliding movement relative to the shaft 11. Journalled in a bracket 29 carried by the member S, and in axial alignment with the shaft 11, is a shaft or tubular member 31 carrying a member 33 of any suitable design, adapted to be secured in well known manner against or within an end of the cylindrical metal article A to be surface coated.

An article-securing member 37 adapted to have an end secured within an end of the article A, has an axial passage in its opposite end, serving to house an end of a shaft 39, the other end of which is secured to the sleeve 25 by suitable means, such as a set screw, for rotation with the sleeve. The shaft 39 is keyed to member 37 for rotation therewith, and for limited sliding movement relative to the latter, being guided by and slidable along the keys 41.

For moving the bracket 27 and parts carried thereby longitudinally of the shaft 11 the bracket 27 has a base plate 43 slidable longitudinally of the support S in guides 45 carried by the latter. A link 47 has an end pivotally secured to bracket 27,—the other end being pivotally secured to the mid-portion of a lever arm 49, one end of which is pivoted upon the support S for movement in a vertical plane. The arrangement of parts is such that movement of the arm 49 in one direction moves the bracket 27 to the right in Fig. 1 and moves the end of shaft 39 within the open end of member 37. Movement of the lever 49 to the left (Fig. 1) disengages the member 39 from member 37.

For concurrently depositing a plurality of bodies of welding metal or alloy upon the surface of the article to be coated or faced therewith, and for applying welding heat progressively to successive portions of the surface of the metal article A, there is provided, in the modification of the invention illustrated, an elongated torch assembly T preferably made of copper, brass, or other suitable metal or alloy of high heat conductivity, adapted to be supported approximately above and longitudinally of the article to be coated.

The torch assembly T includes an elongated torch block 55 having secured to its upper surface as by welding a hollow jacket 56 for circulating a cooling fluid in contact with said block. The torch block 55 has formed therein two longitudinal gas passages 61, 62 adjacent the respective sides of the block, said passages being respectively connected, through conduits 64, 64 with the mixing chambers of the corresponding welding torches 63, 65. Each of said torches is independently fed with a welding gas and with oxygen from suitable sources of supply (not shown).

For supporting a plurality of welding rods of the desired coating metal in contact with the article being surfaced, a plurality of open-ended guide tubes 57 extend through the block 55 and the wall of the jacket 56 opposite said block. The respective ends of each of the guide tubes are suitably secured within said block and the wall of jacket 56, as by brazing. Preferably the guide tubes are closely spaced in a row extending longitudinally of said torch assembly T. The arrangement is such that each guide tube guides and loosely houses for free longitudinal movement therethrough a welding rod 59 of the desired coating metal,—the lower end of said rod resting upon the upper surface of the article A under the action of gravity or of a selected positive pressure, as hereinafter described. The guide tubes may be removably mounted in the assembly T in any suitable manner, to facilitate the use of welding rods of different diameters with the same torch assembly.

For directing welding heat uniformly against the lower ends of the welding rods and the contacting portions of the surface of an article A within a continuous elongated welding zone, a row of closely spaced welding tips 64 are threadedly secured in torch block 55, each of said tips 64 being in communication with passage 61, and being disposed to direct a heating gas flame against the lower end of a corresponding welding rod 59 and the portion of the article A contacting therewith. A second row of closely spaced welding tips 66 similar to tips 64 are secured in block 55, each of said tips 66 being in communication with passage 62, and being adapted to direct a heating gas flame against the lower end of a corresponding welding rod 59 and adjacent portions of the surface of article A. The tips 64, 66 of the respective aligned rows thereof are disposed on opposite sides of the row of closely spaced rods of weld metal. Preferably, as shown, a respective tip of each row thereof is directed to discharge a welding gas upon a corresponding one of the rods of weld metal.

While both rows of torch tips preferably are employed in the welding operation, it is possible, though less advantageous, to complete the coating operation using only one row of tips. However, when both rows are used, tips 64 serve to preheat the article A and to melt the rods 59; while tips 66 assist in melting the rods 59, and serve in welding the deposited coating to the article. It is preferred so to dispose the torch assembly that the points of contact of the welding rods with the surface of the article are slightly forward of the top center of the article, towards the portion of the latter entering the welding zone.

It thus will be seen that the tips of the respective rows thereof are arranged in pairs, each tip of one of said rows being directed to discharge a stream of a welding gas in a path intersecting a stream of a welding gas discharged from a corresponding tip of the other row at an elongated welding zone adjacent the uppermost portion of the surface of the article.

For cooling the torch block 55 during use, a pair of inlet conduits 67 for a cooling fluid are disposed within the jacket 56, and are arranged longitudinally of the respective rows of torch tips. Each conduit 67 is connected with a source of cooling fluid through the respective lines 68, 68; and each is provided with a plurality of longitudinally-spaced rows of apertures 70 for discharging the fluid into the interior of jacket 56. Cooling fluid is withdrawn from the jacket 56 through the respective outlet lines 73, 73, Y-connection 75, and conduit 77.

For supporting the torch block in position above and longitudinally of the article A, there are provided a bracket member 81 having an end secured, as by welding, to a member 82 removably secured to the assembly T. Member 81 has a disc-shaped end portion provided with a grooved surface adapted to interlock with a mating surface of a second bracket member 83 under action of a locking screw 85. For moving the block T vertically, the bracket member 83 is secured to a block 87 mounted for vertical sliding movement upon a vertically-disposed member 89. A sleeve 91, secured to the member 89, carries a plate 93 having a threaded aperture cooperating with the threads on an adjusting screw 95 housed in the block 87. The member 89 is secured upon a supporting block 97 slidable longitudinally of the support S by means of a pinion 99 mounted on block 97 and controlled by handwheel 98, and cooperating with a rack 103 carried upon members 104, 104 of a frame 105. The latter is slidable transversely of the support S along champfered guides 107, 107; and may be locked in selected position by set screws 108. The arrangement, therefore, is such that the torch block may be moved and adjusted vertically, longitudinally and transversely of the article, as well as angularly with respect thereto, so as to adapt the apparatus for use in surfacing non-cylindrical and other articles.

For directing a mild stream of air or other suitable cooling medium upon the freshly laid metal coating at points slightly beyond the torch tips, a valve-controlled air conduit 111 supported upon the torch block T by brackets 112, has a portion thereof extending parallel to the article. The conduit 111 is provided with a plurality of closely spaced apertures 113 directed to discharge air or other cooling medium upon the weld-on overlay and "set" the metal, so as to prevent uncontrolled flow of the deposited metal.

For controlling the feed of coating metal to the article in instances where mechanical or automatic feed of such metal is desired, the feeding mechanism shown in Fig. 4 may be used. This mechanism comprises a pair of shafts or rolls 115, 116, surfaced with a resilient material such as a rubber composition. The shaft 115 is mounted in fixed bearings in members 117 carried by brackets 118 secured to torch assembly 55 at opposite ends thereof. (Only one member 117 is shown.) One end of the shaft 115 is connected with a reversible electric motor 121 through a coupling 122 and reduction gearing 123. Motor 121 is arranged in an electric circuit containing a reversing switch 125 and a variable resistance 127. The respective ends of shaft 116 extend through longitudinal slots in members 117. For urging the roll 116 toward roll 115, each of the members 117 may have secured thereto, as by welding, a pair of cooperating spaced flanged members 129, 129 housing a compression spring 131, which is operatively disposed between a flanged end of each member 129 and the shaft of roll 116. For urging the roll 116 toward roll 115, against the resistance of spring 131, threaded adjusting screws 133 cooperate, respectively, with drilled and tapped apertures in the respective members 117. Each screw 133 has at its end a swivelled member 135 bearing against shaft 116. While, for simplicity, but one of each of the parts 117, 118, 131, 133 and 135, and one pair of members 129 have been shown, it will be understood that similar parts are disposed at the opposite end of the torch assembly.

The arrangement of parts is such that movement of the adjusting screws 133 in one direction forces roll 116 toward roll 115, after overcoming the resistance of springs 131; and movement of the adjusting screws in the opposite direction permits roll 116 to move away from roll 115 under action of springs 131. By adjusting the screws 133, 133 the pressure exerted upon the welding rods 59 by rolls 115, 116 and resilient means 131 may be regulated. The motor 121 and associated parts feed the rods 59 as a unit to the surfacing zone at a uniform selected rate, controlled by the adjustment of the variable resistance 127. After completion of the surfacing operation, the welding rods may be quickly retracted by means of the reversing switch 125.

The following exemplifies the practice of the process, utilizing apparatus of the type shown. A hollow steel cylinder approximately six inches long, and having a five inch outside diameter and approximately a one-inch wall thickness, was rotated at a rate of one revolution each 7.5 minutes, while directing against its upper surface flames from a torch block and tips similar to that shown in Fig. 1, having two rows of fifteen tips each. After one complete revolution, eleven $\frac{3}{16}$-inch welding rods of an alloy of the "Haynes Stellite" type, composed of about 30% chromium, about 5% tungsten, the balance being principally cobalt, were inserted in the rod guides of block T, and the revolution of the cylinder continued, while a mild current of air was blown against the metallic coating leaving the welding zone. After slightly more than one revolution, the welding rods were removed, after which the gas flow to the torch was cut off. The coated article had an outside diameter of $5\frac{5}{16}$ inches. The coating, which was $\frac{5}{32}$ of an inch in thickness, was uniform over the entire outer cylindrical surface of the article, and was of good quality, smooth and completely adherent.

Many variations in the operation may be utilized conveniently. For example, an increase in the thickness of the deposited metal may be secured by raising the torch block and tips further above the article, thereby permitting the flames to play higher upon the welding rods and thus melt more of the latter. Conversely, lowering the torch block directs the flames nearer to the ends of the rods and provides a thinner deposit of weld metal.

Following the coating operation, the coated article may be given a supplemental heat treatment,—after withdrawal of the welding rods,— by suitably reducing the intensity of the torch flames, or by increasing the speed of rotation of the article. Any irregularities in the surface contour of the coated article may be eliminated by rotating the article under the action of the welding flames, following the coating operation, and in the absence of the welding rods.

Although it is preferred to apply the metal overlay in a unitary layer by a single operation, it may be applied, if desired, in successive sections or bands along the article to be coated. When desired, only a selected portion of the circumference of the article need be coated.

It will be understood that, although the invention has been specifically described in connection with the welding of metallic overlays upon cylindrical articles, it may be used, likewise, for providing such overlays upon the surfaces of conical, frusto-conical and other tapered articles, by proper control of the torch flames and/or by regulating the speed of rotation of the article to provide a substantially uniform lineal welding speed independently of the diameter of the article. Similarly, the invention may be applied to the coating of flat or curved plates, or of any other surface that may be caused to move uniformly beneath the torch unit. When an overlap is made upon plate or similar material, the use of a chilling fluid generally is unnecessary. Preferably the plate is moved at a uniform rate past and beneath the multi-tip torches and multi-welding rod guide members shown, or their equivalent.

It will be understood that the bodies of coating metal or alloy may have other shapes than those illustrated. Thus, the coating metal may be in the form of one or more elongated plates, either flat, corrugated or otherwise curved, and adapted to be fed to the welding zone by gravity or by mechanical means in accordance with the invention. The torch block thus may have therein one or more elongated guides to accommodate the body or bodies of coating metal.

By the use of the present invention it is possible to apply readily and conveniently smooth metallic overlays of substantially uniform thickness upon the surfaces of metallic articles having the shapes of cylinders, cones, frustrums of cones, plates, and the like, and composed of metals such as bronze, copper, nickel, steel, and non-ferrous hard-facing alloys such as those of cobalt, chromium and tungsten.

I claim:

1. Process of forming a uniform metallic overlay of a surfacing metal upon the surface of an article, which comprises concurrently guiding a plurality of closely-spaced bodies of the surfacing metal into contact with said surface within an elongated narrow welding zone on said surface, while effecting relative movement at a uniform rate between said surface and each of said bodies of surfacing metal in a direction transversely of the length of said elongated welding zone and bringing successive portions of said surface into contact with said bodies within said welding zone, directing a plurality of closely-spaced welding flames against the successive portions of said surface within said elongated welding zone and against the lower portions of each of said bodies of surfacing metal, and during said relative movement of said surface and said bodies of surfacing metal, maintaining substantially uniform the rate of melting of the respective metal bodies against which the flames are directed, thereby controlling the thickness of the metallic overlap thus deposited.

2. Process as defined in claim 1, together with the succeeding step of directing a cooling fluid upon the molten metal deposit thus formed on the surface of the article, as said molten metal deposit leaves said welding zone during continued movement of said article.

3. Process of forming a metallic coating upon a metal surface of revolution, comprising rotating said surface at a uniform speed about a longitudinal axis while the uppermost portion of said surface is horizontally positioned; applying against said rotating surface a plurality of closely-spaced welding flames disposed in at least one row extending longitudinally of and along the uppermost portion of said surface, thereby defining an elongated welding zone, while feeding a plurality of closely-spaced welding rods in unison into said flames and against said rotating surface, to melt each of said rods simultaneously and form a continuous deposit of molten metal upon and weld the same to contiguous portions of said surface as such surface portions pass said flames and said rods; and so correlating the intensity of said welding flames, the rate of rotation of said surface, and the point of application of said welding flames against said rods, that said continuous deposit will be of substantially uniform thickness throughout, and of a width corresponding approximately to the length of the elongated welding zone, thereby providing a uniform, smooth, welded metallic coating upon said surface.

4. Process as defined in claim 3, wherein oxy-fuel gas carburizing flames are utilized as said welding flames.

5. Process as defined in claim 3, including a preliminary step of directing against said rotating surface a plurality of closely spaced preheating flames arranged in at least one row extending longitudinally of said axis, prior to the application to said surface of said welding flames and said welding rods.

6. Process as defined in claim 3, together with the step of continuously feeding a flux at a uniform rate to said elongated welding zone concurrently with the application of said plurality of welding flames against said rotating surface.

7. Process as defined in claim 3, together with the step of directing a cooling fluid against the molten metal coating, across the entire width of the surface thereof, as the same leaves the elongated welding zone.

8. Process as defined in claim 3, together with the step of quickly withdrawing simultaneously each of said welding rods from said welding zone upon completion of the metal-coating step.

9. Process as defined in claim 3, together with the subsequent steps of, during continued rotation of said surface, withdrawing said welding rods as a unit and directing against the coated surface during at least one revolution of said surface, a plurality of closely-spaced heat-treating flames disposed in at least one row extending longitudinally of said axis thereby heat-treating the coated surface.

10. Process as defined in claim 3, together with the subsequent steps of withdrawing said welding rods as a unit and increasing the rate of rotation of said surface, thereby heat-treating the latter, and discontinuing the application of said flames after approximately one revolution.

11. Process of applying metallic welded on overlays of substantially uniform thickness upon metallic articles having the general shape of a surface of revolution, which comprises progressively applying a plurality of closely spaced layers of molten metal on the surface of said article over a shifting elongated welding zone extending longitudinally of said article, while rotating said article about its longitudinal axis while the uppermost portion of said surface is horizontally positioned, and so correlating the speed of rotation of the article and the rate of feed of molten metal to said surface that the respective molten layers are progressively and uniformly distributed, intermingled, and intimately welded upon said surface, to form a continuous welded-on overlay of uniform thickness, and preventing uncontrolled flow of the deposited molten metal along said surface prior to solidification of the metal in a smooth layer.

12. Process of forming a metallic coating upon an elongated metal surface of revolution, comprising: rotating said surface at a uniform speed about a longitudinal axis while the latter is horizontally positioned; applying against said rotating surface a plurality of welding flames from two rows of closely-spaced welding flame sources respectively disposed longitudinally of said axis, each flame source of one of said rows being directed to discharge a stream of welding gas in a path intersecting a stream of welding gas discharged from a corresponding flame source of said other row at a zone adjacent the uppermost portion of said rotating surface, thereby defining an elongated welding zone, while feeding a plurality of closely-spaced welding rods in unison into said welding zone and against said rotating surface, to melt each of said rods simultaneously and form a continuous deposit of the molten metal upon and weld the same to successive portions of said surface as such surface portions pass said flames and said rods; and so correlating the intensity of said welding flames, the rate of rotation of said surface, and the point of application of said welding flames upon said rods, that said continuous deposit is of substantially uniform thickness throughout, and of a width corresponding to the length of said elongated welding zone, thereby providing a uniform metallic coating upon said surface, effected during substantially one revolution of said surface.

13. Process of forming a metallic coating upon an article having an elongated metal surface of revolution, comprising: directing against said article a plurality of closely-spaced preheating flames disposed in at least one row extending longitudinally of the axis of rotation of said article while rotating said article through at least one revolution, thereafter concurrently disposing a plurality of welding rods with an end of each in contact with the upper surface of said rotating metal article within an elongated welding zone extending longitudinally of the axis of revolution of said article, concurrently directing a plurality of impinging flames against said rotating article within said zone and upon said welding rods, to melt each of said rods simultaneously and form a continuous deposit of the molten metal upon and weld the same to successive portions of said surface as such surface portions pass said flames and said rods, and so correlating the speed of rotation of said article and the intensity of said flames that said continuous deposit is of substantially uniform thickness throughout, and of a width corresponding to the length of said elongated welding zone, thereby producing a smooth welded metal coating of uniform thickness upon said article.

14. Process of forming a metallic coating upon an article having an elongated metal surface of revolution, comprising: directing against said article a plurality of closely-spaced preheating flames disposed in a row extending longitudinally of the axis of rotation of said article, while rotating said article through at least one revolution, thereafter disposing a plurality of closely-spaced welding rods with an end of each in contact with the upper surface of said rotating metal article within an elongated welding zone extending longitudinally of the axis of revolution of said article, concurrently directing each of a plurality of pairs of mutually impinging flames upon said rotating article within said zone and severally upon said welding rods, to melt each of said rods simultaneously and form a continuous deposit of the molten metal upon and weld the same to successive portions of said surface as such surface portions pass said flames and said rods, so correlating the speed of rotation of said article and the intensity of said flames that said continuous deposit is of substantially uniform thickness throughout, and of a width corresponding to the length of said elongated welding zone, thereby producing a smooth welded-on metal coating of uniform thickness upon said article, and directing a cooling medium into contact with the metal coating thus deposited as it leaves said welding zone, thereby chilling the metal coating while maintaining a smooth uniform surface thereon.

15. Process for applying metallic welded-on overlays of substantially uniform thickness upon metallic articles having the general shape of a surface of revolution, which comprises progressively and concurrently applying a plurality of closely-spaced layers of molten metal on the uppermost surface of said article along an elongated welding zone extending longitudinally of said article, while rotating said article about its longitudinal axis with said uppermost surface horizontally positioned, and so correlating the speed of rotation of the article and the rate of feed of molten metal to said surface that the respective molten layers are progressively and uniformly intermingled, and intimately welded to said surface to form a continuous overlay of uniform thickness during at least one full revolution of said article, and progressively withdrawing from said welding zone the successive portions of said article thus provided with a metal overlay while preventing uncontrolled flow of the deposited molten metal along said surface prior to solidification of the metal in a smooth layer.

16. Apparatus for applying welded-on overlays upon metal articles, which comprises, an elongated torch block; means for cooling said block; at least one row of closely-spaced weld-metal guides mounted in said block and extending longitudinally of said block; at least one row of closely spaced torch tips mounted in said block on each side of said row of weld-metal guides, one tip in each row thereof being in the same transverse plane through the block as a corresponding tip of the other row thereof and as a corresponding weld-metal guide, and separate valve-controlled means for independently feeding combustible gas mixtures to the respective rows of tips.

17. Apparatus for applying welded-on overlays upon metal articles, which comprises a torch block; means for cooling said block; an aligned row of welding rod guides in said block; two rows of closely-spaced torch tips respectively disposed on opposite sides of said row of rod guides, one tip in each row thereof being in the same transverse plane through the block as a corresponding tip of the other row thereof and a corresponding welding rod guide; and separate valve-controlled means for independently feeding combustible gas mixtures to the respective rows of torch tips.

18. Apparatus for applying welded-on overlays upon elongated metal articles having the form of articles of revolution, which comprises, means for rotating said article upon its longitudinal axis at a uniform selected rate with its upper surface substantially horizontal; means for directing upon the upper surface of said article a plurality of closely-spaced bodies of weld metal; torch means for concurrently directing upon the upper surface of said article and upon said bodies of metal a plurality of welding flames closely spaced longitudinally of said article; and means adjacent said torch means for directing a cooling medium upon successive portions of the surface of said article leaving said torch means.

19. Apparatus for applying welded-on overlays upon elongated metal articles having the form of articles of revolution, which comprises, means for rotating said article upon its longitudinal axis at a uniform selected rate with its upper surface substantially horizontal; means for directing upon the upper surface of said article a plurality of closely-spaced bodies of weld metal; torch means for directing upon the upper surface of said article and upon said bodies of metal a plurality of welding flames closely-spaced longitudinally of said article, said torch means comprising a torch block, and a plurality of rows of torch tips, a tip of each of said rows being directed to discharge a welding gas in a path intersecting the path of discharge of a corresponding tip of said other row and enveloping a corresponding one of said bodies of weld metal; and means adjacent said torch means for directing a cooling medium upon successive portions of the surface of said article moving from said torch means.

20. Apparatus for forming a uniform welded-on metallic coating upon the surface of an article having the general shape of a surface of revolution, which comprises, mechanism for rotating said article upon its longitudinal axis at a uniform selected rate; means for directing into contact with the upper surface of said article an end of each of a plurality of closely-spaced bodies of coating metal; torch means for heating a shifting zone on the surface of said article, and comprising at least one row of closely-spaced torch tips for melting the coating metal and for welding the latter upon the adjacent surface of said article, the respective tips being directed to discharge flames upon the upper surface of said article within a narrow zone extending longitudinally of said article; and means for directing a cooling fluid upon successive portions of the surface of said article as such portions leave said torch means.

21. Apparatus for applying welded-on overlays upon metal articles, which comprises, an elongated torch block; means for cooling said block; at least one row of weld-metal guides mounted in said block and extending longitudinally of said block; at least one row of closely-spaced torch tips mounted in said block on each side of said row of weld-metal guides, one tip in each row thereof being in the same transverse plane through the block as a corresponding tip of the other row thereof and as a corresponding weld-metal guide; separate valve-controlled means for independently feeding combustible gas mixtures to the respective rows of tips; and means for longitudinally moving said torch block.

22. Apparatus for applying welded-on overlays upon elongated metal articles having the form of articles of revolution, which comprises, means for rotating said article upon its longitudinal axis at a uniform selected rate; means for directing upon an upper horizontally-disposed surface of said article a plurality of closely-spaced bodies of weld metal; torch means for concurrently directing upon successive portions of the upper surface of said article and upon said bodies of metal a plurality of welding flames closely spaced longitudinally of said article; means for moving said torch means as a unit longitudinally of said article; and means for directing a cooling medium upon successive portions of the surface of said article leaving said torch means.

23. Apparatus for applying welded-on overlays upon metal articles, which comprises, means for supporting an article of revolution with an upper surface horizontally positioned; means for rotating said article upon its longitudinal axis while thus positioned; means for directing upon a selected zone on the said surface of such article a plurality of closely-spaced welding flames disposed in at least one row longitudinally of said axis; means for feeding a plurality of closely-spaced welding rods in unison into said flames and against said rotating surface; and means for simultaneously and quickly withdrawing said welding rods as a unit from said rotating surface.

24. Apparatus for applying welded-on overlays upon metal articles, which comprises a support for such article; means for rotating said article; an elongated torch block; means for cooling said block; at least one row of closely-spaced weld-metal guides mounted in said block and extending longitudinally of the latter; at least one row of closely-spaced torch tips mounted in said block on each side of said row of weld-metal guides, one tip in each row thereof being in the same transverse plane through the block as a corresponding tip of the other row thereof and as a corresponding weld-metal guide; and means for concurrently withdrawing from contact with said article each of a plurality of weld-metal bodies operatively associated with the respective weld-metal guides.

25. Apparatus for applying welded-on overlays upon metal articles, comprising an elongated torch block; a row of closely-spaced weld-metal guides mounted in said block and extending longitudinally thereof; said block being provided with two rows of closely-spaced flame-source means disposed on opposite sides of said row of weld-metal guides, flame-source means of each row severally corresponding to said weld-metal guides and to flame-source means of the other row; said weld-metal guides and the several flame-source means being so constructed and arranged that flames from flame-source means of each row will impinge severally against bodies of weld metal in the guides corresponding thereto.

26. Apparatus for applying a welded-on overlay upon a metal article, comprising means for supporting such article with a portion of the surface thereof in position to receive such overlay; means for directing upon a selected zone on said surface a plurality of closely-spaced welding flames arranged in a long and narrow row; means for directing a plurality of closely-spaced welding rods in unison into said flames and against said surface; and means for effecting relative movement between said flame-directing means and said rod-directing means as a unit, and said surface in a direction transversely of the length of said row of welding flames.

27. Apparatus for applying a welded-on overlay upon a metal article comprising means for supporting such article with a portion of the surface thereof in position to receive such overlay; means for directing upon a selected zone on said surface a plurality of closely-spaced welding flames arranged in a long and narrow row; means for directing a plurality of closely-spaced welding rods in unison into said flames and against said surface; means for effecting relative movement between said flame-directing means and said rod-directing means as a unit, and said surface in a direction transversely of the length of said row of welding flames; and means for effecting relative movement between said flame-directing means and said rod-directing means as a unit, and said surface in a direction lengthwise of said row of welding flames.

28. Apparatus for applying welded-on overlays upon metal articles, which comprises, an elongated torch block; at least one row of weld-metal guides mounted in said block and extending longitudinally of the block; at least one row of closely-spaced flame source means mounted in said block on each side of said row of weld-metal guides, one flame source means in each row thereof being in the same transverse plane through the block as a corresponding flame source means of the other row thereof and as a corresponding weld-metal guide; and means for effecting relative movement between said torch block and said article in a direction longitudinally of the article.

ROBERT LUTHER WAGNER.